US008108940B2

(12) United States Patent
Dias et al.

(10) Patent No.: US 8,108,940 B2
(45) Date of Patent: Jan. 31, 2012

(54) METHOD FOR PROTECTING DATA FROM UNAUTHORISED ACCESS

(75) Inventors: Daniel M Dias, Mohegan Lake, NY (US); Matthias Schunter, Zurich (CH); Michael Steiner, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 11/612,515

(22) Filed: Dec. 19, 2006

(65) Prior Publication Data
US 2008/0144825 A1    Jun. 19, 2008

(51) Int. Cl.
G06F 21/00    (2006.01)
(52) U.S. Cl. .......................................... 726/28; 380/259
(58) Field of Classification Search .................... 380/259
See application file for complete search history.

(56) References Cited

U.S. PATENT DOCUMENTS

| 6,212,280 B1* | 4/2001 | Howard et al. ............... 380/279 |
| 6,230,267 B1* | 5/2001 | Richards et al. ............... 713/172 |
| 7,568,102 B2* | 7/2009 | Liu et al. ...................... 713/176 |
| 2002/0048369 A1* | 4/2002 | Ginter et al. .................. 380/277 |

* cited by examiner

Primary Examiner — David Garía Cervetti
Assistant Examiner — Ghazal Shehni
(74) Attorney, Agent, or Firm — Michael J. Buchenhorner

(57) ABSTRACT

The present invention relates to a method for protecting user data from unauthorized access, the method comprising the steps of, on a data processing system:
  maintaining said user data in encrypted form stored on a second storage,
  when loading an operating system using an operating system loader:
receiving in a first disk key transmission step from a first user system a symmetric user key that is only accessible by the data processing system if the operating system loader has been started on behalf of said first user system, wherein the symmetric user key is received sealed to a combination of the operating system loader and a user identifier corresponding to said first user system in said first disk key transmission step;
accessing the symmetric user key, if the operating system loader has been started on behalf of said first user system;
decrypting in a user data decryption step said user data using the symmetric user key, maintaining said symmetric user key in a volatile memory.

13 Claims, 5 Drawing Sheets

METHOD FOR PROTECTING DATA FROM UNAUTHORISED ACCESS

TECHNICAL FIELD

The present invention relates to a method for protecting data of a user of a data processing system from unauthorized access by another user of that data processing system.

BACKGROUND OF THE INVENTION

Grid computing and utility computing provides remote users with resources that are shared among multiple users. One problem that has restricted the use of grids, especially beyond a single enterprise's intra-grid, is that the data from a computation at a grid node could be readable by a subsequent user of the same grid resource, in particular in the case where a grid node or a logical partition, such as a virtual machine, of a grid node is sequentially allocated and used by different users. A desirable security feature is to clear a resource of confidential data when switching from user to user. It would be useful if no information about a computation of a user is leaked to a next user that acquires the same resource.

The Trusted Computing Group (TCG) Specification Architecture Overview Revision 1.2, 28 Apr. 2004, gives an introduction to TCG goals and architecture. It defines anticipated scenarios for use of Trusted Platform Modules (TPM) enabled platforms, compliance procedures and anticipated implications on manufacturing and support processes.

Accordingly, it is desirable to provide a method that renders the data of one user of a data processing system screened from and unavailable to another user of the system.

SUMMARY OF THE INVENTION

According to an embodiment of an aspect of the present invention, there is provided a method for protecting user data from unauthorized access, the method comprising the steps of, on a data processing system: maintaining the user data in encrypted form stored on a second storage, when loading an operating system using an operating system loader: receiving in a first disk key transmission step from a first user system a symmetric user key that is only accessible by the data processing system if the operating system loader has been started on behalf of the first user system, wherein the symmetric user key is received sealed to a combination of the operating system loader and a user identifier corresponding to the first user system in the first disk key transmission step; accessing the symmetric user key, if the operating system loader has been started on behalf of the first user system; decrypting in a user data decryption step the user data using the symmetric user key, maintaining the symmetric user key in a volatile memory. This method is advantageous in that the user data are transmittable in an encrypted form whereby unauthorized access is hampered. The symmetric user key is protected by a mechanism that necessitates a configuration of the operating system loader being started for the user who is authorized to access the user data. This allows the data processing system to run operating systems for multiple users while access by those users to the user data of the other users is hampered. It also is operable to allow startup of the operating system by the user but also by the operator system that controls the data processing system. Such operator system-driven startup could be useful, for instance, for providing the functionality of loadbalancing.

Preferably, an embodiment of the present invention further comprises a user data transmission step for receiving from the user system the user data. In this way, the user may transmit its user image to any data processing system to initialize the operating system for that user system.

Desirably, an embodiment of the present invention further comprises a key agreement protocol step for agreeing with the user an updated user key. In this way, both the user system and the data processing system possess the updated user key.

Preferably, the operating system loader comprises a bootloader.

Desirably, in an embodiment of the present invention, in the first disk key transmission step, the sealing is created in a first sealing step by use of a first trusted platform module in accordance with the TCG specification architecture.

Preferably, an embodiment of the present invention further comprises a second sealing step for sealing the symmetric user key to a combination of the operating system loader and the user identifier corresponding to the first user system. Desirably, a second disk key transmission step is performed for transmitting to an operator system the symmetric user key sealed to the combination of the operating system loader and the user identifier. Preferably, a startup command step is performed for receiving from an operator system the user key sealed to the combination of the operating system loader and the user identifier. In this way, the data processing system shuts down and reboots, upon initialization by an operating system coupled thereto, so that the scope of visibility of user data received from a user system is reduced to other user systems.

Desirably, a user reboot command step is performed for rebooting upon a reboot command from the first user system. When the first user system initialises the reboot, it starts here with the user image being encrypted by a sealed user key. In this way, a reboot may be performed for a previous user of the data processing system in a way that confidential data received from that user is not visible to other users.

Preferably, an operator reboot command step is performed for rebooting upon a reboot command from the operator system. When the operating system issues a reboot command to the data processing system, it also communicates to the data processing system the sealed user key. Since the user key can only be unpacked if the configuration to which the key has been sealed and which corresponds to a specific user is loaded on the data processing system, user data encrypted with the key may not be accessed by other users.

According to a further embodiment of the present invention, there is provided a method for protecting user data from unauthorized access, the method comprising the step of, on a first user system: transmitting in a first disk key transmission step to a data processing system a symmetric user key that is only accessible by the data processing system if an operating system loader has been started on behalf of the first user system, the symmetric user key being transmitted sealed to a combination of the operating system loader and a user identifier corresponding to the first user system in the first disk key transmission step, such that the data processing system accesses the symmetric user key if the operating system loader has been started on behalf of the first user system, decrypts in a user data decryption step the user data using the symmetric user key, maintains the user data in encrypted form stored on a second storage, and maintains the symmetric user key in a volatile memory.

According to an embodiment of a further aspect of the present invention, there is provided a computer program product comprising a computer-readable medium embodying program instructions executable by a processor to perform a method as hereinbefore described.

The advantages of the further aspect of the invention correspond to the advantages of the first aspect of the invention.

BRIEF DESCRIPTION OF THE DRAWINGS

Reference will now be made, by way of example, to the accompanying drawings in which.

DETAILED DESCRIPTION OF THE DRAWINGS

Figure 1:
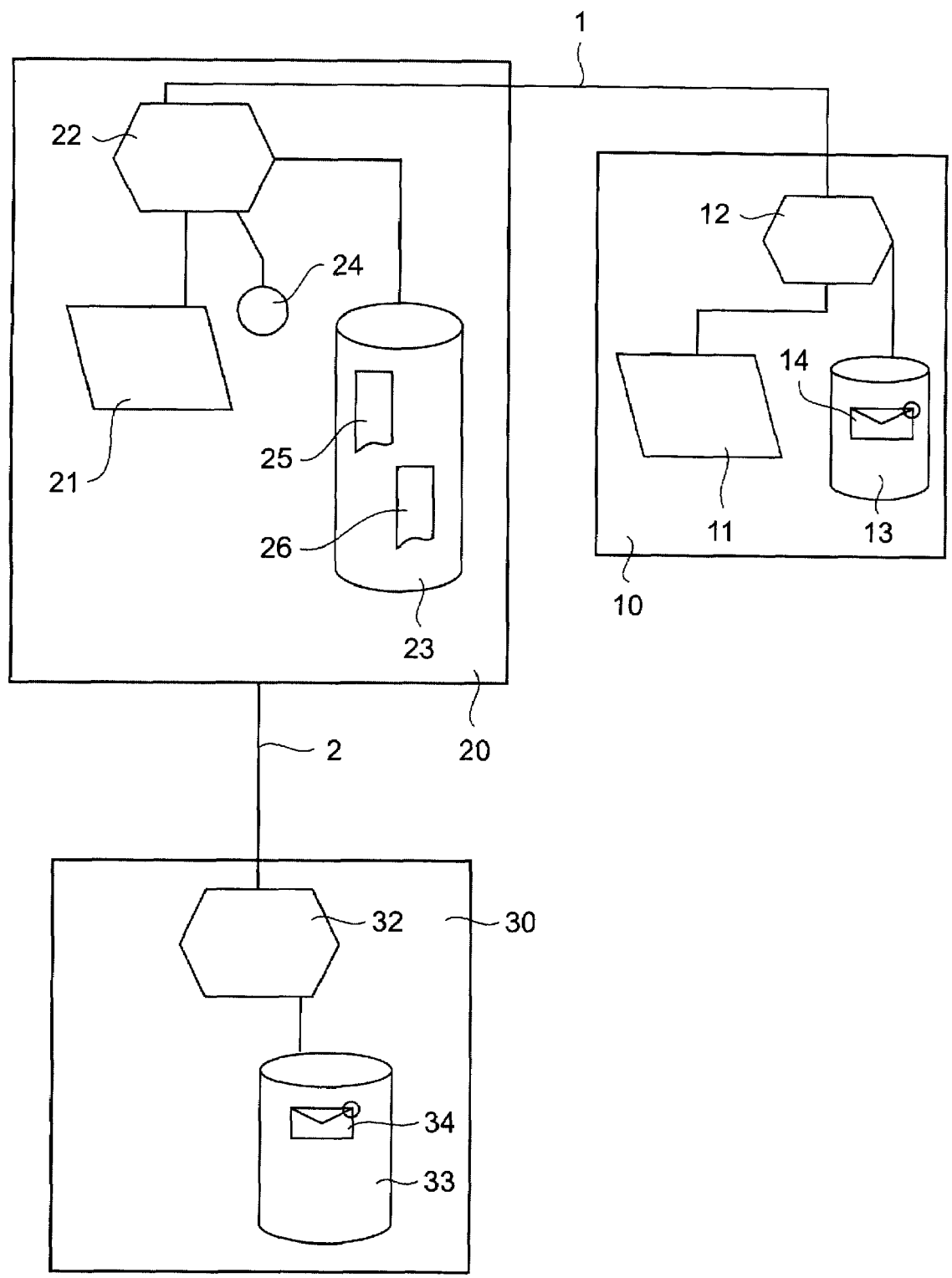
FIG. 1 is a schematic diagram illustrating a data processing system coupled to a first user system and an operator system.

FIG. 1 is a schematic diagram illustrating a data processing system 20 coupled to a first user system 10 and an operator system 30. The first user system 10 comprises a first processor 12 that is connected to a first controller unit 11 and a first storage unit 13 in which a sealed key 14 is stored. The first processor 12 is coupled to a second processor 22 that is a part of the data processing system 20 via a first network connection 1. The second processor 22 is connected to a second controller unit 21, a RAM 24 and a second storage 23. The second storage 23 comprises a first user image 25 and a second user image 26. The data processing system 20 is coupled to a third processor 32 via a second network connection 2. The third processor 32 is a part of the operator system 30 and is connected to a third storage 33 in which a sealed key 34 is stored. On the data processing system 20, an embodiment of the present invention can be executed for protecting user data from unauthorized access.

An embodiment of the present invention can leverage a TCG service.

The first service is called "attestation". Attestation allows a user to remotely verify the integrity of a configuration. Attestation can hence be used to verify that a configuration holds only encrypted data on a harddisk such that a shutdown enforces that the key is lost.

The second service is sealing. Sealing is an operation provided by a computing platform that enables to seal confidential information to a configuration that has been loaded on this computing platform. In other terms the confidential information is only accessible if the configuration that it has been sealed to is actually present on the computing platform. This feature can be used to guarantee that the confidential information is not obtained by another configuration during startup, such as a different user.

The main mechanisms to protect sequential confidentiality is to encrypt the harddisk using a key and while keeping any image that is booted on that harddisk, the key is only kept in volatile memory. Once the machine is shut down, the key will be erased from the volatile memory. As a consequence, the data on the disk will not be visible to a subsequent user.

A user has a personal configuration image, for example, comprising an encrypted partition including OS, applications, and data, that is encrypted. This image is only startable if the customer agrees and the base configuration, such as hardware, BIOS, boot loader, of the system is verified to provide certain integrity guarantees, for example, the image is started on "pure" hardware and not on a simulator. This may include starting the same image on different data processing systems. In order to facilitate serial reuse, and later reuse by the same user, the data processing system can provide logical encrypted disk partitions assigned to the different users. The mapping of users to partitions can be public, and determined by a user ID to disk partition index, but the access to the partition would require the key, and is controlled by the above described methods. The price charged to a user could then be a function of the usage time and the time and size for retaining a secure disk partition.

An embodiment of the present invention can leverage the services of the TPM to enhance data security while booting. This includes:

User is talking to "his" data processing system;
The data processing system boots the encrypted OS;
Only the data processing system obtains the key Ku1;
The data processing system does not store the key Ku1 on the harddisk or other non-volatile memory;
Optionally, the data processing system only starts an OS image when the user approves this.

Figure 2:
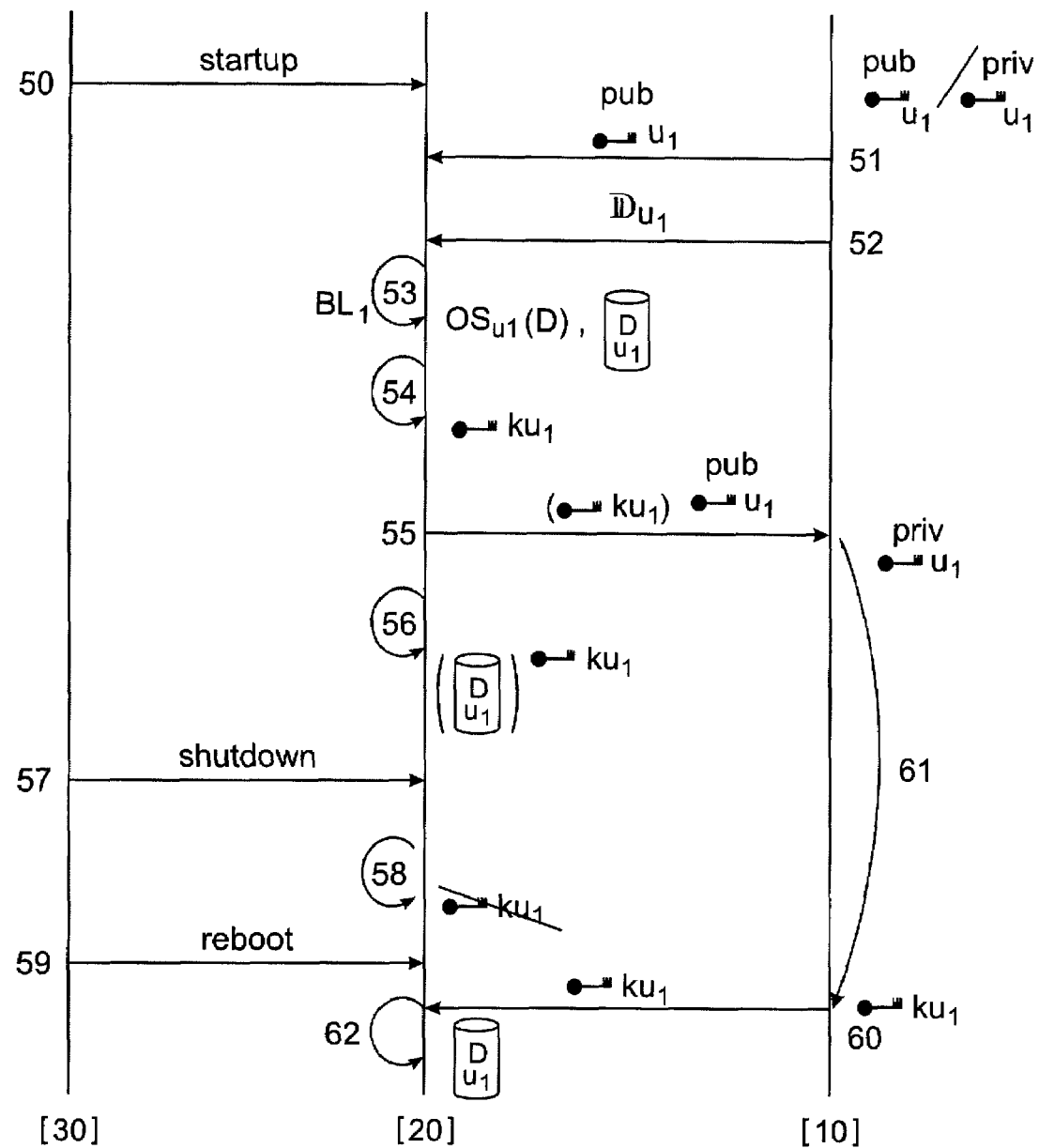
FIG. 2 is a schematic illustration of a method to boot an operating system for a user.

In FIG. 2, the steps of an installation method are illustrated. The operator system 30 issues a startup command in a startup command step 50 to the data processing system 20. The first user system 10 possesses a private and public key pair, comprising a public key $pub_{U1}$ and a private key $priv_{U1}$. The first user system 10 sends in a public key transmission step 51 its public key $pub_{U1}$ to the data processing system 20. This step could be initiated by the data processing system 20 informing the first user system 10 about the startup command received. It is also possible that the first user system 10 has instructed the operator system 30 to issue the startup command and thereafter sends the public key $pub_{U1}$. The first user system 10 also sends in a user image transmission step 52 user data $D_{U1}$, also referred to as first user image 25, to the data processing system 20. Having received the public key $pub_{U1}$ and the user data $D_{U1}$ the data processing system 20 performs an operating system loading step 53 using an operating system loader, for example, a boot loader BL1. The boot loader BL1 can be available from a public source. In this way, an operating system for the first user system 10 is started up using the received user data $D_{U1}$. The result of the operating system loading step 53 is a running operating system image $OS_{U1}$(D), with the first user image 25 being stored in the second storage 23. The operating system image $OS_{U1}$(D) has been customized with the first user image 25. Thereafter the data processing system 20 performs a disk key generation step 54. Therein the operating system image $OS_{U1}$(D) generates a symmetric key $K_{U1}$ and encrypts this key $K_{U1}$ using the received public key $pub_{U1}$ of the first user system 10. The resulting encrypted symmetric key $K_{U1}$ is then sent in a first disk key transmission step 55 to the first user system 10, where it can be unpacked in a disk key decryption step 61 using its private key $priv_{U1}$. The operating system image $OS_{U1}$(D) operates while encrypting its second storage 23 in a first disk encryption step 56 using the symmetric key $K_{U1}$. Since the user data $D_{U1}$ has been stored in that second storage 23 it is also encrypted with the symmetric key $K_{U1}$. The symmetric key $K_{U1}$ is kept in the RAM 24.

The operator system 30 can at any later point in time execute a shutdown command step 57 wherein it sends a shutdown command to the data processing system 20. Thereupon the data processing system 20 performs a shutdown step 58 performing a shutdown, in the course of which the operating system image $OS_{U1}$(D) is stopped, and the content of the RAM 24 is deleted. Thereafter the data processing system 20 no longer has access to the symmetric key $K_{U1}$. However, the first user system 10 has access to the symmetric key $K_{U1}$ which means that only the first user system 10 can access the operating system image $OS_{U1}(D)$ by using the received and unpacked symmetric key $K_{U1}$. This also is the case if the data processing system 20 breaks down or is hibernated.

This method bears the risk that the operating system image $OS_{U1}(D)$ could be accessible by the operator system 30 or by a second user. Such a second user could access the user data $D_{U1}$ during the user image transmission step 52 because that user data $D_{U1}$ is transmitted without cryptographic protection.

At any later point in time the operator system 30 can execute an operator reboot command step 59 by sending a reboot command to the data processing system 20 whereupon it can receive from the first user system 10 the symmetric key $K_{U1}$ in a second disk key transmission step 60. This step can again be either executed by the first user system 10 on request by the data processing system 20 or by the first user system 10 after that first user system 10 has initiated the rebooting operation by requesting the operator system 30 to execute the operator reboot command step 59. Then, the data processing system 20 performs a disk decryption step 62 wherein it uses the received symmetric key $K_{U1}$ to decrypt the second storage 23 and hence obtain the decrypted operating system image $OS_{U1}(D)$. Thereby the data processing system 20 can restart the operating system image $OS_{U1}(D)$ for the first user system 10.

Figure 3:
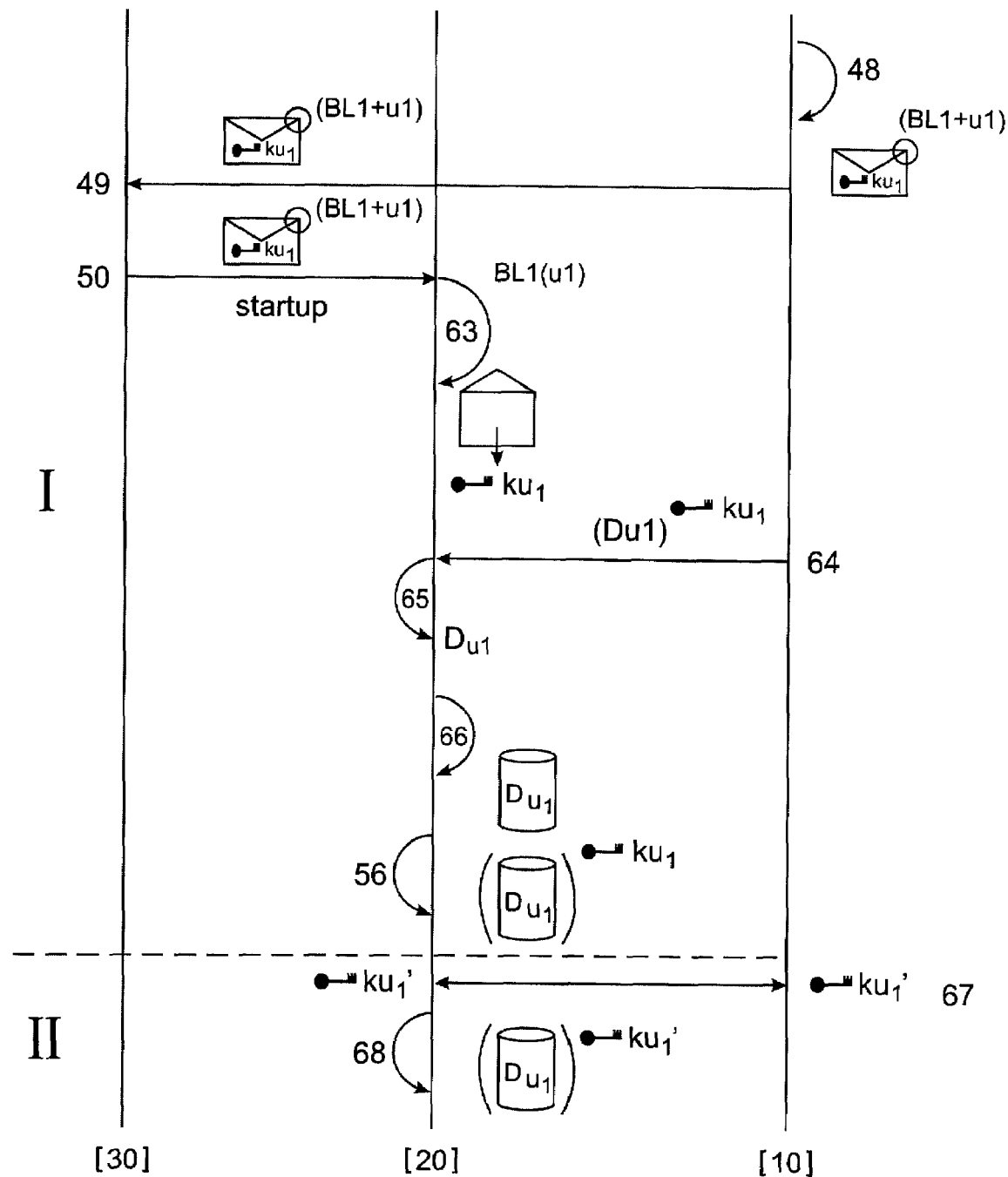
FIG. 3 is a schematic illustration of a method to reboot an operating system for a user.

In FIG. 3, a method is illustrated for installation of an operating system image using a sealed symmetric key $K_{U1}$.

In a first sealing step 48 the first user system 10 generates a symmetric key $K_{U1}$ and seals that symmetric key $K_{U1}$ to the configuration BL1+U1. This step 48 effectuates that the symmetric key $K_{U1}$ can only be accessed if the boot loader BL1 is started for the first user system 10. Herefore a mechanism of the TPM specification can be used that is referred to as sealing. It is hence advantageous to equip the first user system 10 with a TPM module that is able to perform such sealing. The result of this step 48 is the sealed symmetric key $K_{U1}$, which is in the following also referred to as sealed message. Then the first user system 10 sends in a first disk key transmission step 49 this sealed message to the operator system 30.

Once the operator system 30 performs the startup command step 50 it forwards the sealed message to the data processing system 20. There the sealed message is opened in an unsealing step 63 by satisfying the configuration of starting the boot loader BL1 for the first user system 10. As a result the data processing system 20 obtains the symmetric key $K_{U1}$. In other words the data processing system 20 starts a boot loader BL1 which again could be available from a public source, for the first user system 10.

The first user system 10 also uses the symmetric key $K_{U1}$ for encrypting the user image $D_{U1}$. For having the data processing system 20 startup an operating system for the first user system 10 the first user system 10 sends the encrypted user image $D_{U1}$ to the data processing system 20.

Once the first user system 10 has, in an encrypted user image transmission step 64, transmitted the encrypted user image $D_{U1}$ to the data processing system 20, the data processing system 20 performs a user data decryption step 65, using the unsealed symmetric key $K_{U1}$, thereby obtaining the decrypted user image $D_{U1}$. In a user image storing step 66 the data processing system 20 stores the user image $D_{U1}$ in the second storage 23 and in a first disk key encryption step 56 encrypts the user image $D_{U1}$ using the symmetric key $K_{U1}$.

Since the user image $D_{U1}$ has been transmitted in an encrypted form this user image $D_{U1}$ can contain confidential information which is not visible to or accessible by a second user without the symmetric key $K_{U1}$. The result is again a running operating system image $OS_{U1}(D)$, with the first user image 25 being stored in the second storage 23. The operating system image $OS_{U1}(D)$ has been customized with the first user image 25.

The above booting process is referred to in FIG. 3 with roman number I.

Roman number II refers to an optional process of generating a session key $k_{U1'}$, also referred to as updated user key. The symmetric session key $k_{U1'}$ can be generated by making use of a key agreement protocol in a key agreement protocol step 67. As a result thereof both, the first user system 10, and the data processing system 20 possess the symmetric session key $k_{U1'}$. At the data processing system 20 the boot loader BL1 encrypts the user image $D_{U1}$ using the symmetric session key $k_{U1'}$.

Figure 4:
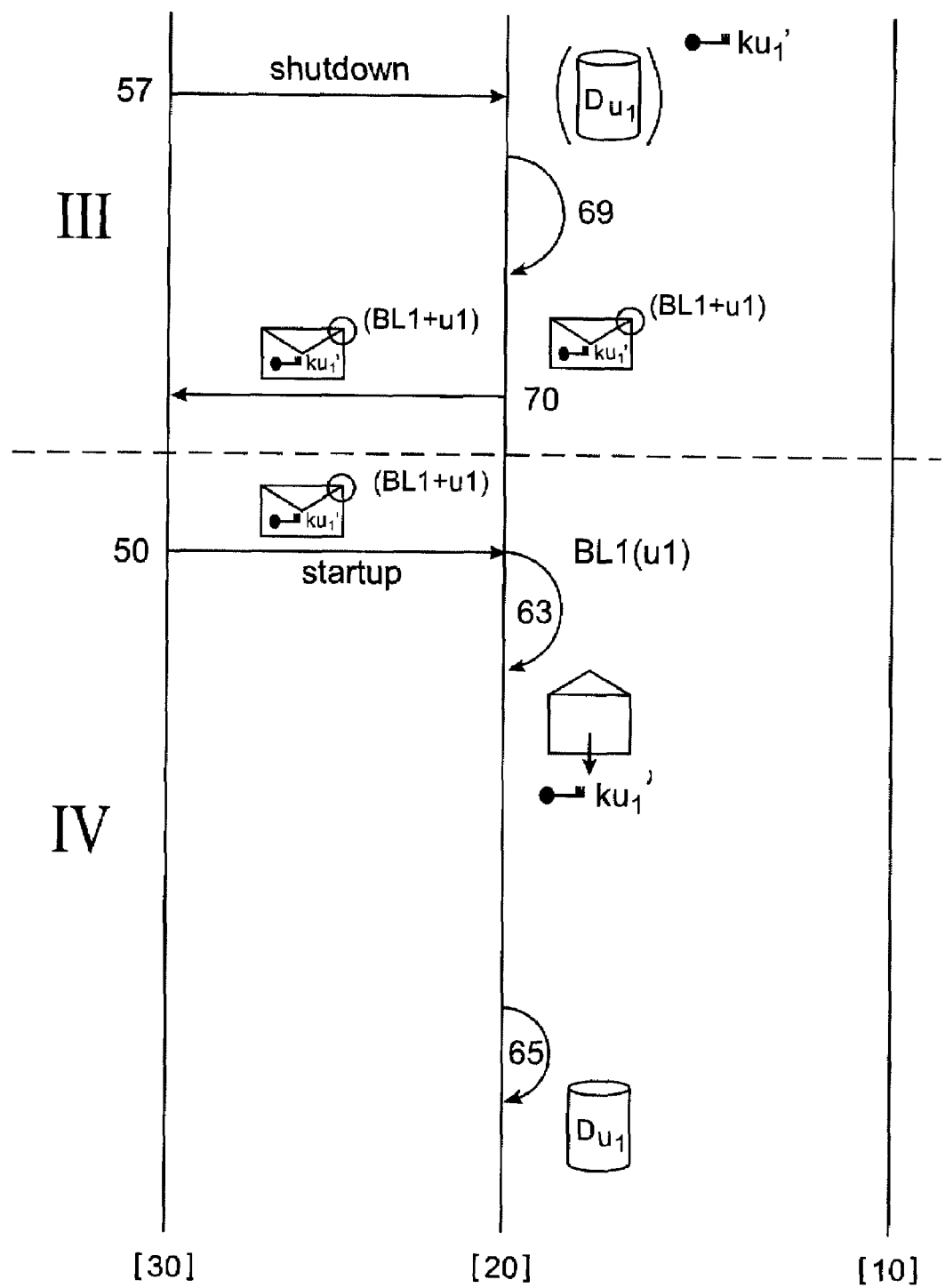
FIG. 4 is a schematic illustration of a boot method initiated by an operator system.

In FIG. 4, the process of shutdown and rebooting the operating system image $OS_{U1}(D)$ upon initialization by the operator system 30 is illustrated. It is desired to enable the data processing system 20 for any user system 10 that has previously used the data processing system 20, to reboot in a way that the visibility of user data $D_{U1}$ received from that user system 10 to other user systems is reduced.

The operator system 30 can execute a shutdown command step 57 wherein it sends a shutdown command to the data processing system 20. The data processing system 20 here starts the shutdown process in a state where it has the user image $D_{U1}$ stored in the second storage 23, wherein the user image $D_{U1}$ has been encrypted by the symmetric session key $k_{U1'}$. If the key agreement protocol step 67 has not been used before, the user image $D_{U1}$ has been encrypted by the symmetric user key $k_{U1}$.

In a second sealing step 69 the boot loader BL1 seals the symmetric session key $k_{U1'}$ to the configuration of BL1+U1, i.e. that symmetric session key $k_{U1'}$ is only accessible if the boot loader BL1 is started for the first user system 10. In a second sealed disk key transmission step 70 the boot loader BL1 of the data processing system 20 hands the sealed symmetric session key $k_{U1'}$ over to the operator system 30. This shutdown process is denoted with roman number III in FIG. 4.

Next, the rebooting of the operating system image $OS_{U1}(D)$ upon initialization by the operator system 30 is described, as denominated by roman number IV in FIG. 4. There might be arrangements where the data processing system 20 can choose what image to start without asking the first user system 10. For instance in a networked environment wherein several user systems run several operating system images on several data processing systems the operator system for that networked environment can in an effort to perform load balancing decide to redistribute the load on the various data processing systems. In such case, the number of running operating system images for one user can be reduced, for example, if that user has less processes actively running, while the number of operating system images for another user system can be increased, for example, if that user needs more operating system images to operate its processes. This kind of loadbalancing would be conducted without involvement of the user systems, i.e. autonomously by the operator system.

When the operator system 30 decides to reboot the boot loader BL1, it starts here with the encrypted second storage 23 containing the user image $D_{U1}$, wherein the user image $D_{U1}$ has been encrypted by the symmetric session key $k_{U1'}$. The symmetric session key $k_{U1'}$ has been sealed to BL1+U1 and the seal can be maintained in the PCR, i.e. platform configuration register, of the operator system 30. Having added the identity of the user U1 as a component of the seal to the PCR ensures that the operator system 30 can obtain the user identity at any time. Since the symmetric session key $k_{U1'}$ can only be retrieved/unsealed if BL1+U1 are correctly stored in the PCR, the operator system 30 can also ask for the corresponding PCR value and thus validate/obtain the user ID U1 that has been stored in the PCR. In this way, the operator system 30 can identify the user at any time when this is desired.

The operator system 30 issues a startup command in the startup command step 50 to the data processing system 20. The operator system 30 also communicates to the data processing system 20 the symmetric session key $k_{U1'}$ sealed to (BL1+U1). There the sealed symmetric session key $k_{U1'}$ is opened in the unsealing step 63 by satisfying the configuration of starting the boot loader BL1 for the first user system 10. As a result the data processing system 20 obtains the symmetric session key $k_{U1'}$. In other words the data processing system 20 starts a boot loader BL1 which again could be available from a public source, for the first user system 10.

The data processing system 20 performs a user data decryption step 65, using the unsealed symmetric session key $k_{U1'}$, thereby obtaining the decrypted user image $D_{U1}$.

Figure 5:
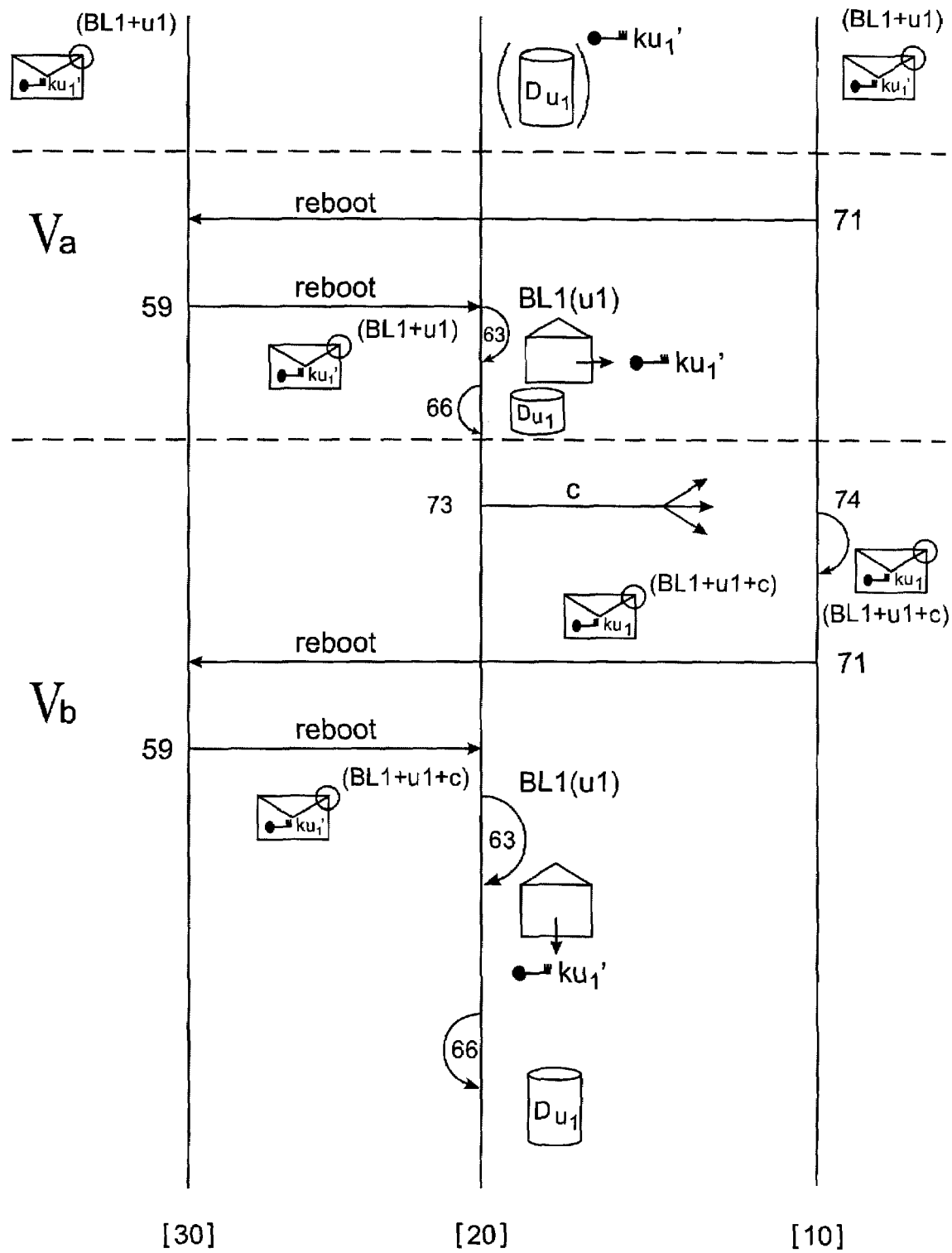
FIG. 5 is a schematic illustration of a boot method initiated by a user system.

FIG. 5 is a schematic illustration of a boot method initiated by a user system. The goal is to enable the data processing system 20 to reboot for any user U that has previously used the data processing system 20 in a way that confidential data received from that user U is not visible to other users. Roman numerals Va and Vb in FIG. 5 respectively denote alternative boot methods initiated by a user system.

When the first user system 10 initialises the reboot, it starts here with the encrypted second storage 23 containing the user image $D_{U1}$, wherein the user image $D_{U1}$ has been encrypted by the symmetric session key $k_{U1'}$. The symmetric session key $k_{U1'}$ has been sealed to BL1+U1 and the seal can be maintained in the PCR, i.e. platform configuration register, of the operator system 30.

With reference to the method denoted by roman numeral Va, a reboot command is initiated at the first user system 10 and transmitted therefrom in a reboot command step 71 to the operating system 30. In response, the operating system 30 issues a reboot command in the reboot command step 59 to the data processing system 20. The operating system 30 also communicates to the data processing system 20 the symmetric session key $k_{U1'}$ sealed to (BL1+U1). There, the sealed symmetric session key $k_{U1'}$ is unpacked in the unsealing step 63 by satisfying the configuration of starting the boot loader BL1 for the first user system 10. The data processing system 20 performs a user data decryption step 66, using the unsealed symmetric session key $k_{U1'}$, thereby obtaining the decrypted user image $D_{U1}$.

With reference to the method denoted by roman numeral Vb, when the data processing system 20 is rebooted, a sealing parameter c is initiated and transmitted to the user system 10 in a sealing parameter broadcast step 73. In response, the user system 10 executes a third sealing step 74 in which the sealing parameter c is used to seal symmetric session key $k_{U1'}$, which is sealed to the configuration (BL1+U1+c). When a reboot command is initiated by the user system 10 and transmitted to the operating system 30 in the reboot command step 71 as hereinbefore described with reference to the method denoted by roman numeral Va, the sealed symmetric session key $k_{U1'}$ is also transmitted to the operating system 30. In response, the operating system 30 issues a reboot command in the reboot command step 59 to the data processing system 20. The operating system 30 also communicates to the data processing system 20 the symmetric session key $k_{U1'}$ sealed to (BL1+U1+c). There, the sealed symmetric session key $k_{U1'}$ is opened in the unsealing step 63 by satisfying the configuration of starting the boot loader BL1 for the first user system 10. The data processing system 20 performs a user data decryption step 66, using the unsealed symmetric session key $k_{U1'}$, thereby obtaining the decrypted user image $D_{U1}$. In this case, the operating system 30 cannot seal the symmetric session key $k_{U1'}$ to the configuration (BL1+U1+c) even if it has the sealing parameter (c) since it only has the symmetric session key $k_{U1'}$ in a sealed configuration and no means to open that seal.

An embodiment of the present invention may be used for individual data processing systems as described above, or for logical partitions of a data processing system that are secure from other logical partitions running on the same data processing system. Each logical partition uses one of the methods described above, and sequential reuse is of a logical partition.

An embodiment of the present invention may also be generalized to a case where the user accesses a set of data processing systems for the purpose of parallel computation. The set of data processing systems then comprise a set of secure data processing systems. In this case, for accessing user data, a central "customer control" data processing system may be used. Confidential information pertaining to unlocking the set of data processing systems in order to access user data may be stored on the customer control data processing system. From a broader view, the user may unlock his control data processing system while this control data processing system then unlocks the computing data processing systems on behalf of the user.

Another generalization is that of providing a safe suspend operation at a data processing system, where the user's private data is written to disk, and the private data is cleared from memory, all information on the keys are removed from memory, and the data processing system or logical partition can then be serially reused for another user using the same OS. This can be done by storing in a predetermined portion of memory pseudo-random data and then verifying that the data processing system can retrieve this data.

An embodiment of the present invention has been described with reference being made to the operating system loader being implemented as a bootloader BL1. The present invention is, of course, not limited thereto and any other appropriate operating system loader may be selected for this purpose.

An embodiment of the present invention may be implemented in part or as a whole in software or hardware or a combination thereof. It may, implemented in hardware, be performed by an apparatus for protecting data from unauthorized access. It may, implemented in software, be performed by a computer program product. The computer program product may be provided on a computer readable medium embodying software instructions executable by a computer to perform the steps of an embodiment of the method aspect of the present invention. The computer-readable medium may, for example, be a CD-ROM, a DVD, a flash memory card, a hard disk, or any suitable computer-readable medium, e.g. a storage medium within a network.

The present invention has been described above purely by way of example and modifications of detail can be made within the scope of the present invention.

Each feature disclosed in the description and, where appropriate, the claims and drawings may be provided independently or in any appropriate combination.

The invention claimed is:

1. A method for protecting user data from unauthorized access, the method comprising steps of, on a data processing system:

maintaining said user data in encrypted form stored on a second storage device, said user data comprising a user's personal configuration image;

when loading an operating system using an operating system loader: receiving in a first disk key transmission step from a first user system a symmetric user key that is only accessible by the data processing system if the operating system loader has been started on behalf of said first user system, wherein the symmetric user key is received sealed to a combination of the operating system loader and a user identifier corresponding to said first user system in said first disk key transmission step;

accessing the symmetric user key, if the operating system loader has been started on behalf of said first user system; and decrypting in a user data decryption step said user data using the symmetric user key, maintaining said symmetric user key in a volatile memory.

2. The method according to claim 1, further comprising a user data transmission step for receiving from the first user system said user data.

3. The method according to claim 1, further comprising a key agreement protocol step for agreeing with the user an updated user key.

4. The method according to claim 1, wherein the operating system loader comprises a bootloader.

5. The method according to claim 1 wherein, in the first disk key transmission step, the sealing has been created in a first sealing step by use of a first trusted platform module in accordance with the TCG specification architecture.

6. The method according to claim 1, further comprising a second sealing step for sealing the symmetric user key to a combination of said operating system loader and said user identifier corresponding to said first user system.

7. The method according to claim 6, further comprising a second disk key transmission step for transmitting to an operator system the user key sealed to the combination of said operating system loader and said user identifier.

8. The method according to claim 6, further comprising a startup command step for receiving from an operator system the symmetric user key sealed to the combination of said operating system loader and said user identifier.

9. The method according to claim 8, further comprising a user reboot command step for rebooting upon a reboot command from the first user system.

10. The method according to claim 8, further comprising an operator reboot command step for rebooting upon a reboot command from the operator system.

11. Computer program product comprising a non-transitory computer-readable medium embodying program instructions executable by a processor to perform a method according to claim 1.

12. A method for protecting user data from unauthorized access, the method comprising a step of, on a first user system:

transmitting in a first disk key transmission step to a data processing system a symmetric user key that is only accessible by the data processing system if an operating system loader has been started on behalf of said first user system, said symmetric user key being transmitted sealed to a combination of the operating system loader and a user identifier corresponding to said first user system in said first disk key transmission step, such that the data processing system accesses the symmetric user key if the operating system loader has been started on behalf of said first user system, decrypts in a user data decryption step said user data using the symmetric user key, maintains said user data in encrypted form stored on a second storage, and maintains said symmetric user key in a volatile memory, wherein said user data comprises the user's personal configuration image.

13. Computer program product comprising a non-transitory computer-readable medium embodying program instructions executable by a processor to perform a method according to claim 12.

* * * * *